(12) United States Patent
Sohler et al.

(10) Patent No.: US 10,920,876 B2
(45) Date of Patent: Feb. 16, 2021

(54) METHOD AND CONTROL DEVICE FOR OPERATING A TRANSMISSION

(71) Applicant: ZF Friedrichshafen AG, Friedrichshafen (DE)

(72) Inventors: Michael Sohler, Isny (DE); Magnus Stiefenhofer, Amtzell (DE); Tobias Hartmann, Korntal-Münchingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 288 days.

(21) Appl. No.: 15/919,787

(22) Filed: Mar. 13, 2018

(65) Prior Publication Data
US 2018/0266548 A1 Sep. 20, 2018

(30) Foreign Application Priority Data
Mar. 17, 2017 (DE) ...................... 10 2017 204 469.1

(51) Int. Cl.
*F16H 61/04* (2006.01)
*F16H 61/686* (2006.01)
(Continued)

(52) U.S. Cl.
CPC ........... *F16H 61/04* (2013.01); *F16H 61/061* (2013.01); *F16H 61/686* (2013.01); *F16H 3/66* (2013.01); *F16H 2003/442* (2013.01); *F16H 2003/445* (2013.01); *F16H 2059/186* (2013.01); *F16H 2061/0481* (2013.01); *F16H 2061/0496* (2013.01); *F16H 2061/062* (2013.01);
(Continued)

(58) Field of Classification Search
None
See application file for complete search history.

(56) References Cited

U.S. PATENT DOCUMENTS 8,788,163 B2   7/2014  Arnold et al.
2012/0283064 A1* 11/2012 Herbeth ................. F16H 61/04
                                                  475/275
(Continued)

FOREIGN PATENT DOCUMENTS

DE        102009002206 A1    10/2010

OTHER PUBLICATIONS

German Search Report DE102017204469.1, dated Jan. 4, 2016. (10 pages).

*Primary Examiner* — Charles A Fox
*Assistant Examiner* — Ryan P Dodd
(74) *Attorney, Agent, or Firm* — Dority & Manning, P.A.

(57) ABSTRACT

A method for operating a drivetrain of a motor vehicle includes elevating a system pressure acting on a plurality of shift elements (A, B, C, D, E, F) when one of at least one positively locking shift element (A, F) is closed in a force-locking-free state, increasing a torque output by a drive assembly (15) and then subsequently reducing the torque output by the drive assembly (15) while the system pressure is elevated by an intervention with the drive assembly (15), and reducing the system pressure after reducing the torque output by the drive assembly (15). The one of the at least one positively locking shift element (A, F) closed in the force-locking-free state or another one of the at least one positively locking shift element (A, F) is opened while the system pressure is elevated and the torque output by the drive assembly (15) changes.

11 Claims, 3 Drawing Sheets

(51) Int. Cl.
*F16H 61/06* (2006.01)
*F16H 3/66* (2006.01)
*F16H 3/44* (2006.01)
*F16H 59/18* (2006.01)

(52) U.S. Cl.
CPC ........... *F16H 2200/0065* (2013.01); *F16H 2200/2012* (2013.01); *F16H 2200/2041* (2013.01); *F16H 2200/2046* (2013.01); *F16H 2200/2064* (2013.01); *F16H 2200/2094* (2013.01)

(56) References Cited

U.S. PATENT DOCUMENTS

| | | | | |
|---|---|---|---|---|
| 2014/0230590 A1* | 8/2014 | Arnold | ............ | F16H 3/02 74/335 |
| 2015/0127231 A1* | 5/2015 | Maurer | ............ | F16H 61/04 701/55 |
| 2017/0120919 A1* | 5/2017 | Schiele | ............ | B60W 10/06 |
| 2017/0334421 A1* | 11/2017 | Schiele | ............ | B60K 6/48 |

* cited by examiner

METHOD AND CONTROL DEVICE FOR OPERATING A TRANSMISSION

FIELD OF THE INVENTION

The invention relates generally to a method and a control device for operating a drivetrain of a motor vehicle.

BACKGROUND

From practice, transmissions of motor vehicles are known which have both positively locking shift elements and frictionally locking shift elements. The positively locking shift elements are in particular dog clutches. The frictionally locking shift elements are in particular friction clutches or brakes. In every engaged gear ratio of such a transmission, a first number of shift elements of the transmission is closed, and a second number of shift elements of the transmission is open, wherein, when a gear ratio change from a current gear ratio to a target gear ratio is performed, at least one previously closed shift element is opened, and at least one other, previously open shift element is closed.

SUMMARY OF THE INVENTION

The invention relates to a method for operating a drivetrain having a transmission which has at least one positively locking shift element and preferably at least one frictionally locking shift element, wherein the drivetrain has a drive assembly and a drive in addition to the transmission. Here, the invention relates to a method for operating a drivetrain of said type, with which method, when at least one positively locking shift element is closed in a force-locking-free state of the transmission, the positively locking shift element or one of the positively locking shift elements can be disengaged in the transmission while maintaining the force-locking-free state. This has hitherto not been possible.

Taking this as a starting point, the present invention is accordingly based on the object of providing a method and a control device for operating a drivetrain, with which, in the case of closed positively locking shift elements in a force-locking-free state of the transmission, one of the positively locking shift elements can be opened, specifically without establishing or producing a force locking action in the transmission.

According to the invention, when the at least one positively locking shift element is closed in a force-locking-free state, this or one of the closed positively locking shift elements is opened such that a system pressure acting on the shift elements is firstly increased. Subsequently, at elevated system pressure, the torque output by the drive assembly is increased and is subsequently reduced again by an intervention of the drive assembly, and the system pressure is thereafter reduced again.

With the invention, the at least one positively locking shift element or one of the positively locking shift elements can be easily and reliably disengaged in the force-locking-free state of the transmission, specifically without the need to establish or produce a force locking action in the transmission.

In one advantageous refinement, the system pressure is increased preferably in a manner dependent on a rotational speed difference between the rotational speed of a transmission input shaft of the transmission and a rotational speed of the drive assembly or alternatively in a manner dependent on a torque at the transmission input shaft. Likewise, the torque output by the drive assembly, by the intervention thereof, is increased preferably in a manner dependent on the rotational speed difference between the rotational speed of a transmission input shaft of the transmission and a rotational speed of the drive assembly or alternatively in a manner dependent on a torque at the transmission input shaft. The establishment of the system pressure and the provision of the torque intervention by the drive assembly in a manner dependent on the rotational speed difference between the rotational speed of the transmission input shaft and the rotational speed of the drive assembly is particularly preferable in order to disengage or open one of the positively locking shift elements in the force-locking-free state of the transmission.

In one advantageous refinement, the system pressure is increased when there is a control demand for disengaging one of the closed positively locking shift elements, in particular in the event of a change in a transmission selector lever position from the position D to the position N.

The system pressure is preferably reduced again when the magnitude of the rotational speed difference between the rotational speed of a transmission input shaft of the transmission and a rotational speed of the drive assembly is lower than a threshold value, in particular when the rotational speed of the drive assembly and the rotational speed of the transmission input shaft cross.

The intervention of the drive assembly, and thus the increase of the torque output by the drive assembly, is preferably ended before the system pressure is reduced again.

In this way, in the force-locking-free state, one of the previously closed positively locking shift elements can be easily and reliably disengaged without establishing a force locking action in the transmission.

In particular, the method is carried out in a sailing mode of the motor vehicle, specifically when, during sailing, one single shift element of the transmission more is open than in a force locking gear ratio, and when, during sailing, a transmission selector lever position is changed from the position D to the position N. The method according to the invention is particularly preferably used in the sailing mode.

BRIEF DESCRIPTION OF THE DRAWINGS

Preferred refinements will emerge from the claims and from the following description. Exemplary embodiments of the invention will be discussed in more detail on the basis of the drawings without being restricted thereto. In the drawings:

DETAILED DESCRIPTION

Figures 1, 2:
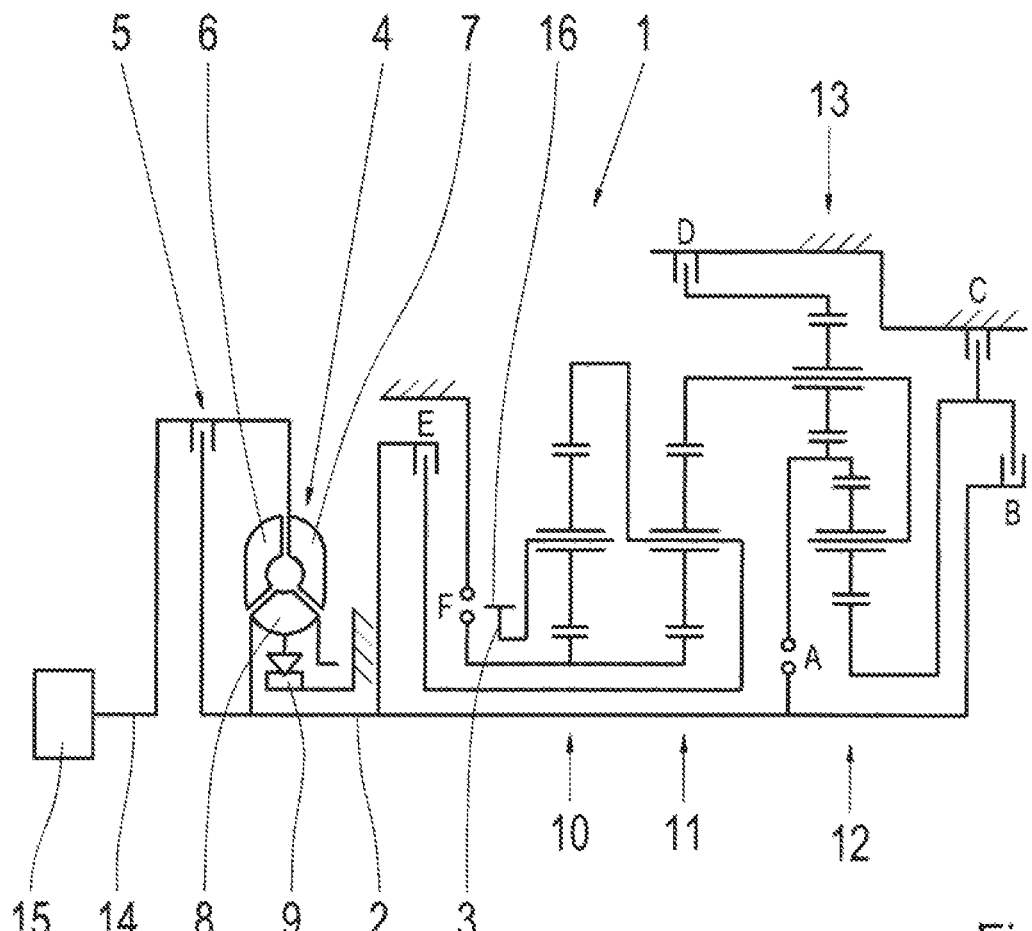
FIG. 1 is a schematic illustration of a transmission together with a converter.
FIG. 2 shows an engagement sequence matrix of the transmission of FIG. 1.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The present invention relates to a method for operating a drivetrain of a motor vehicle.

FIG. 1 shows a schematic diagram of a drivetrain with a transmission 1 designed as an automatic transmission together with a torque converter 4, a drive assembly 15, and an output 16. The transmission 1 includes a transmission input shaft 2 and a transmission output shaft 3.

The torque converter 4 has a converter lockup clutch 5, a turbine 6, a impeller 7 and a stator 8, wherein the stator 8 is connected to a so-called freewheel or overrunning clutch 9. When the converter lockup clutch 5 is closed, the turbine 6 and the impeller 7 are coupled to one another. The transmission input shaft 2 corresponds to the torque converter output shaft or the turbine shaft of the torque converter 4. The output is coupled to the transmission output shaft 3. The drive assembly 15 is coupled to the torque converter input shaft 14. Although in FIG. 1 the transmission input shaft 2 is coupled to the turbine 6 of the converter 4 and thus the transmission input shaft 2 corresponds to the output shaft of the converter 4, it will be understood that the invention may also be used in an automatic transmission without a torque converter 4 of said type. In this case, a separating clutch or launch clutch is then connected between the transmission input shaft 2 and a drive shaft of the drive assembly 15.

The transmission 1 shown in FIG. 1 has multiple gear sets 10, 11, 12 and 13, and multiple shift elements A, B, C, D, E and F. In the exemplary embodiment shown, the transmission 1 accordingly includes six shift elements A through F. The shift elements A and F are designed as positively locking shift elements or dog clutches and the shift elements B, C, D and E are designed as frictionally locking shift elements. In the exemplary embodiment shown, the frictionally locking shift elements B and E are clutches, and the frictionally locking shift elements C and D are brakes.

In every engaged gear ratio in the transmission 1 of FIG. 1, a first number of shift elements is closed and a second number of shift elements is open. The table of FIG. 2 indicates, for nine available forward gear ratios 1 through 9 and for the reverse gear ratio R, in each case those shift elements which are closed or engaged, and open or disengaged, in the respective gear ratio. In the table of FIG. 2, closed or engaged shift elements are each denoted by an X. It can be seen from the table that, in every engaged gear ratio in the transmission 1, three shift elements are closed and three shift elements are open.

When, at a transmission selector lever (not shown) of the transmission 1, the selector lever position D for forward travel is selected and the motor vehicle is operated in a sailing mode in a manner dependent on operating parameters thereof, the transmission 1 is in a force-locking-free and thus non-force-locking state, wherein it is then the case that one single shift element more is open than in a force locking gear ratio. Here, by opening a previously closed shift element, a switch can be performed from each of the forward gear ratios into a sailing gear ratio, in which two shift elements are closed and four shift elements are open and in which the transmission 1 is accordingly in a force-locking-free state.

In such a force-locking-free state of the transmission 1, in which two positively locking shift elements are closed, when it is subsequently sought to disengage one of the positively locking shift elements for example in order to transfer the transmission 1 into a neutral position N, this should, for comfort reasons, be performed without establishing a force locking action in the transmission 1, which has however hitherto not been possible.

The present invention relates to a method and a control device for operating a drivetrain of a motor vehicle, by which, when at least two positively locking shift elements are closed in a force-locking-free state of the transmission 1, one of the closed positively locking shift elements can be opened, specifically without the need for a force locking action to be established in the transmission 1 for this purpose.

According to the invention, it is provided that, when at least two positively locking shift elements, the two positively locking shift elements A and F in the exemplary embodiment of FIG. 1, are closed in a force-locking-free state of the transmission, and when it is sought to open one of the closed positively locking shift elements, a system pressure acting on the shift elements of the transmission 1 is firstly increased, and subsequently, at elevated system pressure, the torque output by the drive assembly 15 is increased by an intervention of the drive assembly 15 and subsequently the torque output by the drive assembly 15 is reduced again, wherein the system pressure is thereafter reduced again. This permits an advantageous disengagement of one of the positively locking shift elements without the need to produce a force locking action in the transmission 1.

Figure 3:
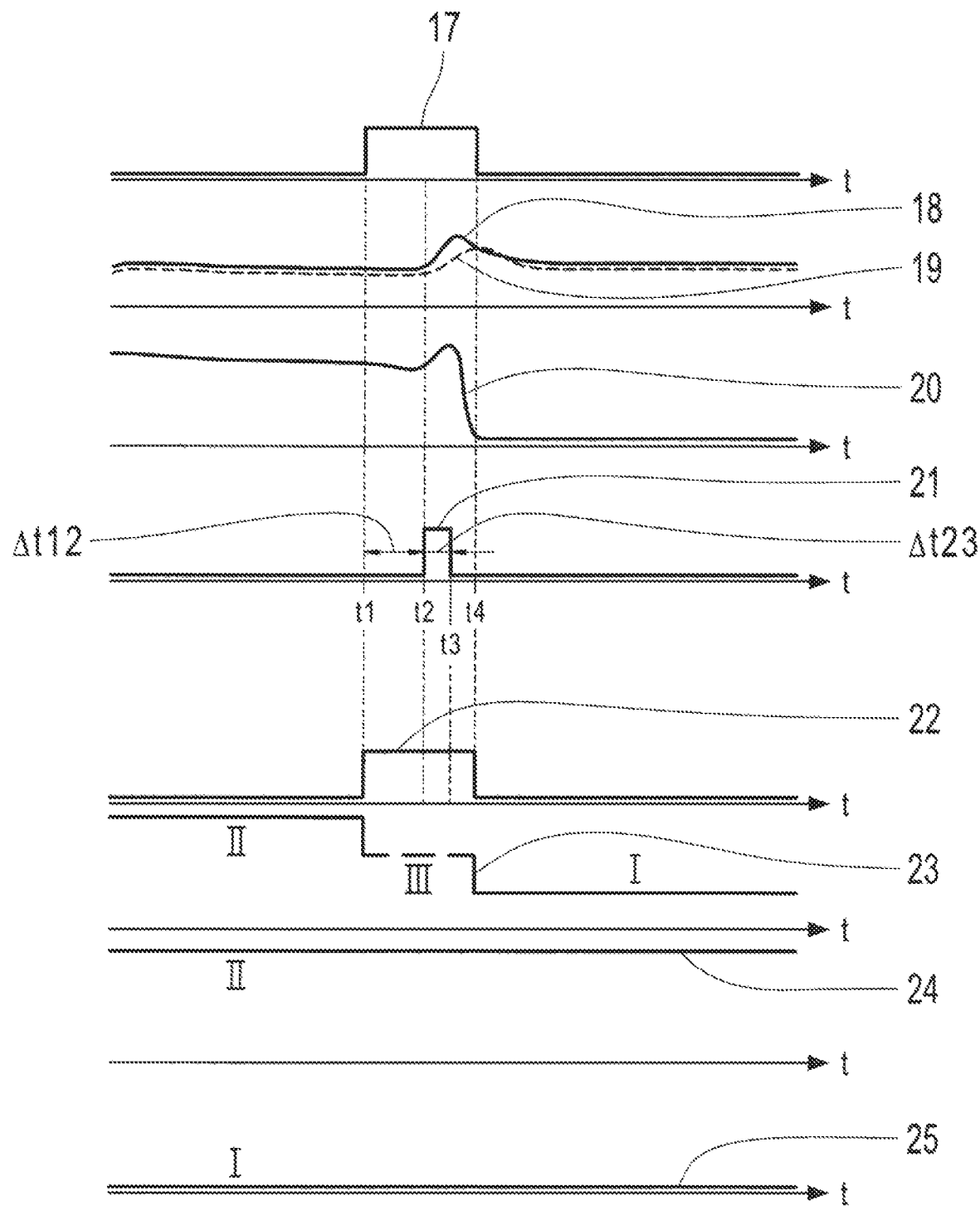
FIG. 3 shows a first time diagram for illustrating the method according to the invention for operating a drivetrain.
Figure 4:
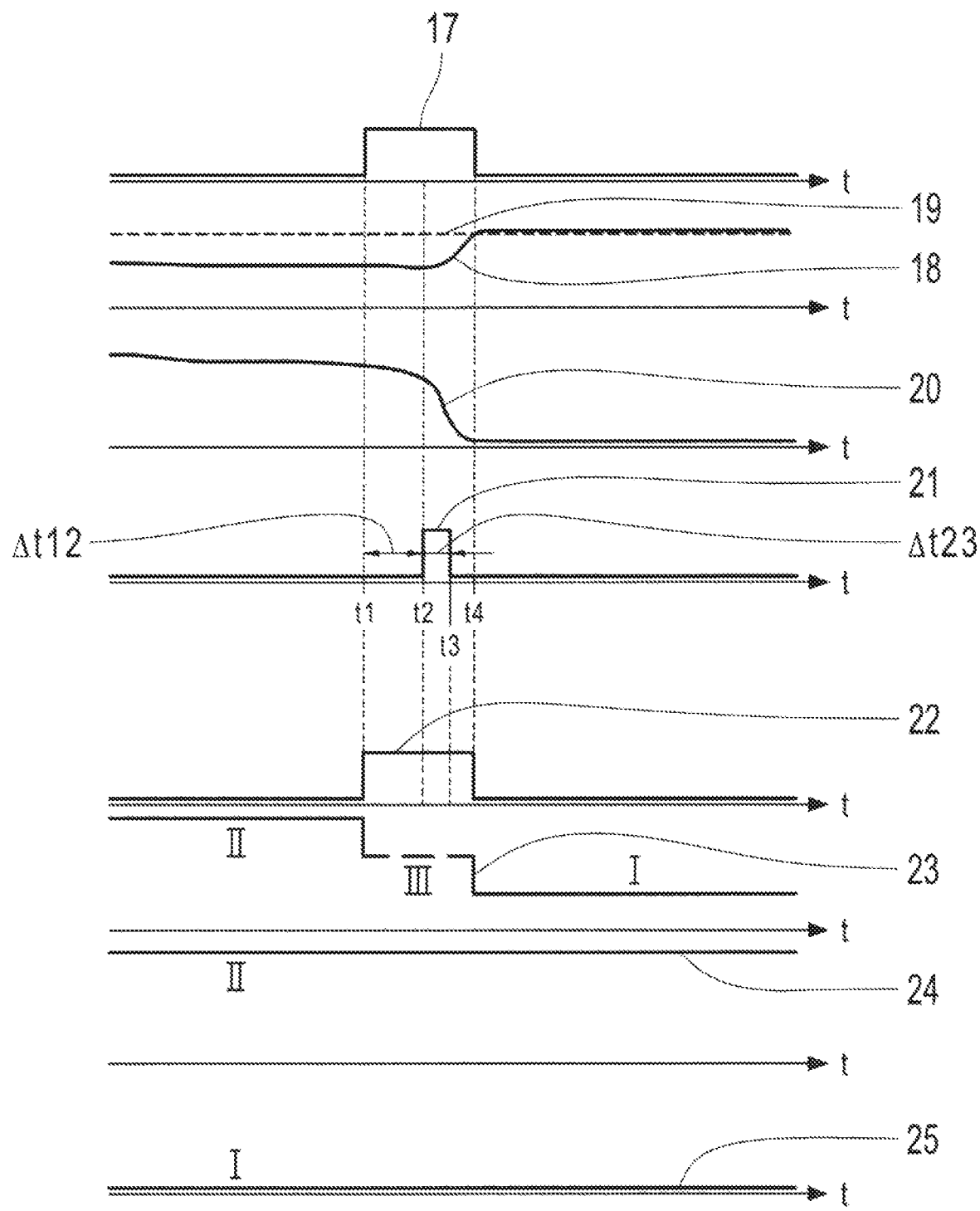
FIG. 4 shows a second time diagram for illustrating the method according to the invention for operating a drivetrain.

Further details of the invention will be described below with reference to FIGS. 3 and 4. FIGS. 3 and 4 each show curve profiles 17, 18, 19, 20, 21, 22, 23, 24 and 25 with respect to time.

The curve profile 17 with respect to time shows in each case the shift duration required for disengaging a positively locking shift element to be opened. The curve profiles 18 show in each case a rotational speed profile of a rotational speed of the drive assembly 15, and the signal profiles 19 show in each case a rotational speed profile of a rotational speed of the transmission input shaft 14 of the transmission 1, which in the exemplary embodiment shown corresponds to the turbine rotational speed of the converter 4. Curve profiles 20 show a torque profile for the positively locking shift element to be opened. The curve profiles 22 show a profile of the system pressure with respect to time, and the curve profiles 21 show a profile of an intervention of the drive assembly 15, e.g., also referred to herein as an engine intervention, with respect to time.

The curve profiles 23, 24 and 25 show a state of shift elements, wherein the state I corresponds to an open shift element and thus a disengaged state, the state II corresponds to a closed shift element and thus an engaged state, and the state III corresponds to a state which corresponds to an intermediate position between the engaged state and the disengaged state.

Here, the curve profile 23 illustrates the state of the positively locking shift element to be opened, and the curve profile 24 illustrates the state of that positively locking shift element which remains closed. The curve profile 25 illustrates the state of the other shift elements, specifically, in the exemplary embodiment of FIG. 1, of all of the frictionally locking shift elements B, C, D and E, which all are or remain open.

In the exemplary embodiment of FIG. 3, the opening of one of the previously closed positively locking shift elements is demanded at the time t1. It can be seen from FIG. 3 that, before the time t1, in the state II, both positively locking shift elements of the transmission 1 are closed, wherein the positively locking shift element to be opened transmits a torque as per the curve profile 20. In this state, the positively locking shift element to be opened cannot yet be opened, and can at most be transferred into an intermediate state III.

Starting at the time t1, the system pressure acting on the shift elements of the transmission 1 is firstly increased as per the curve profile 22. The increase of the system pressure, specifically the magnitude of the increase of the system pressure, is preferably dependent on the rotational speed difference between the rotational speed of the transmission input shaft and the rotational speed of the drive assembly; alternatively, the increase of the system pressure may also be dependent on a torque acting on the transmission input shaft 2.

Following the increase of the system pressure at the time t1, the torque output by the drive assembly 15 is increased by an intervention of the drive assembly 15 at the time t2 as per the curve profile 21, and said torque is subsequently reduced again at the time t3, which also has a similar effect on the torque of the positively locking shift element to be opened, as per the curve profile 20, which reaches a value of approximately zero again at the time t4. At the same time, the system pressure is elevated, as per the curve profile 22.

Only thereafter, at the time t4, is the system pressure also reduced again as per the signal profile 22, wherein the positively locking shift element to be opened then assumes the open state I as per the signal profile 23.

Like the increase of the system pressure, the intervention of the drive assembly 15 preferably also occurs in a manner dependent on the rotational speed difference between the rotational speed of the transmission input shaft 2 of the transmission 1 and the rotational speed of the drive assembly 15 or alternatively in a manner dependent on the torque acting on the transmission input shaft 2.

The increase of the system pressure at the time t1 occurs in particular when there is a control demand for disengaging the previously closed positively locking shift element, in particular when, in a sailing mode of the motor vehicle in which one single shift element more is open than in a force-locking state and in which the two positively locking shift elements A and F are closed, the disengagement of one of the previously closed positively locking shift elements A or F is demanded by a movement of the transmission selector lever from the position D for forward travel into a position N for a neutral position.

The increase of the torque output by the drive assembly 15 at the time t2 preferably occurs a defined time period Δt12 after the time t1. The reduction of the engine intervention at the time t3 preferably occurs a defined time period Δt23 after the time t2. The reduction of the system pressure at the time t4 occurs when the magnitude of the rotational speed difference between the rotational speed of the transmission input shaft 2 and the rotational speed of the drive assembly 15 is lower than a threshold value, in particular when the rotational speed of the drive assembly 15 and the rotational speed of the transmission input shaft 2 cross or intersect, as shown in FIG. 3.

In the exemplary embodiment of FIG. 3, in which, at the start, the rotational speed of the drive assembly 15 as per the curve profile 18 is higher than the rotational speed 19 of the transmission input shaft 2, the increase of the torque effected by the engine intervention firstly causes the rotational speed of the drive assembly to be increased, and owing to the inertias in the gear sets 12 and 13 of the transmission, the rotational speed of the transmission input shaft 2 follows the rotational speed of the drive assembly 15 with a delay.

After the end of the engine intervention, the rotational speed of the transmission input shaft 2 falls with the rotational speed of the drive assembly 15, but with a delay in relation to the rotational speed of the drive assembly 15, wherein this direction reversal of the inertias causes a crossing of the rotational speed of the drive assembly 15 and the rotational speed of the transmission input shaft 2.

When this crossing of rotational speeds occurs, the positively locking shift element to be disengaged is free from load, as per the signal profile 20, and is automatically disengaged owing to the elevated system pressure, such that the positively locking shift element to be opened is then transferred into the open state I, as per the signal profile 23. Accordingly, in FIG. 3, the positively locking shift element to be opened is relieved of load by a direction reversal of the inertias.

FIG. 4 shows curve profiles 17 through 25 with respect to time, analogously to the curve profiles 17 to 25 with respect to time in FIG. 3, for the situation in which, at the start of the method, the rotational speed at the transmission input shaft 2 or the rotational speed of the turbine of the converter 4, illustrated by the curve profile 19, is higher than the rotational speed of the drive assembly 15.

In this case, the rotational speed of the drive assembly 15 is increased as per the curve profile 18 by the increase of the torque output by the drive assembly 15 as per the curve profile 21. The rotational speed difference between the rotational speed of the drive assembly 15 and the rotational speed of the transmission input shaft 2 initially gives rise to drag torques, whereby a torque—illustrated by the curve profile 20—acts at the transmission input or on the positively locking shift element to be opened, which torque initially prevents the disengagement of the positively locking shift element to be opened. By contrast to the method illustrated by FIG. 3, the torque on the positively locking shift element to be opened decreases more intensely proceeding from the time t2, and reaches a value of at least approximately zero at the time t4.

By an increase of the rotational speed 18 of the drive assembly 15 in the direction of the rotational speed of the transmission input shaft 2 and thus in the direction of the rotational speed of the turbine of the converter 4, said torque at the transmission input is reduced, and ultimately the torque acting on the positively locking shift element to be opened is eliminated, such that the positively locking shift element to be opened can be disengaged in a load-free manner.

With regard to the remaining details of FIG. 4, reference can be made to the statements relating to FIG. 3.

The present invention also relates to a control device for carrying out the method, that is to say to a control device for operating a drivetrain of a motor vehicle, which control device, when two positively locking shift elements are closed in the force-locking-free state of the transmission 1, actuates a hydraulic system of the transmission 1 and the drive assembly 15 in the context of the method according to the invention in order to be able to open one of the previously closed positively locking shift elements without establishing a force-locking action in the transmission 1. To increase and reduce the system pressure, the control device actuates the hydraulic system of the transmission 1. To increase and reduce the intervention of the drive assembly 15, the control device actuates the drive assembly 15 or a control device of the drive assembly 15.

The control device includes means for carrying out the method according to the invention, specifically hardware means and software means. The hardware means include data interfaces for exchanging control data with the assemblies involved in carrying out the method according to the invention. Furthermore, the control device includes, as hardware means, a processor for data processing and a memory for data storage. The software means include program modules for carrying out the method according to the invention.

Modifications and variations can be made to the embodiments illustrated or described herein without departing from the scope and spirit of the invention as set forth in the appended claims.

REFERENCE DESIGNATIONS

1 Transmission
2 Converter output shaft/transmission input shaft
3 Transmission output shaft
4 Converter
5 Converter lockup clutch
6 Turbine wheel
7 Pump wheel
8 Guide wheel
9 Freewheel
10 Gear set
11 Gear set
12 Gear set
13 Gear set
14 Converter input shaft
15 Drive assembly
16 Output
17 Curve profile
18 Curve profile
20 Curve profile
21 Curve profile
22 Curve profile
23 Curve profile
24 Curve profile
25 Curve profile
A Positively locking shift element
B Frictionally locking shift element
C Frictionally locking shift element
D Frictionally locking shift element
E Frictionally locking shift element
F Positively locking shift element

The invention claimed is:

1. A method for operating a drivetrain of a motor vehicle, the drivetrain having a drive assembly (15), a transmission (1) and an output (16), the transmission (1) having a plurality of shift elements with at least one positively locking shift element (A, F) and at least one frictionally locking shift element (B, C, D, E), a first number of the plurality of shift elements is closed and a second number of plurality of shift elements is open in each engaged force locking gear ratio of the transmission (1), at least one more shift element of the plurality of shift elements is open in a force-locking-free state of the transmission (1) than in a force locking gear ratio of the transmission (1), the method comprising:
elevating a system pressure acting on the plurality of shift elements (A, B, C, D, E, F) when one of the at least one positively locking shift element (A, F) is closed in a force-locking-free state;
while the system pressure is elevated, increasing a torque output by the drive assembly (15) and then subsequently reducing the torque output by the drive assembly (15) by an intervention with the drive assembly (15); and
reducing the system pressure after reducing the torque output by the drive assembly (15);
wherein the one of the at least one positively locking shift element (A, F) or another one of the at least one positively locking shift element (A, F) is opened while the system pressure is elevated and the torque output by the drive assembly (15) changes.

2. The method of claim 1, wherein the system pressure is elevated in a manner dependent on a rotational speed difference between the rotational speed of a transmission input shaft (2) of the transmission (1) and a rotational speed of the drive assembly (15) or in a manner dependent on a torque at the transmission input shaft (2).

3. The method of claim 1, wherein the torque output by the drive assembly (15) is increased by the intervention of the drive assembly (15) in a manner dependent on a rotational speed difference between the rotational speed of a transmission input shaft (2) of the transmission (1) and a rotational speed of the drive assembly (15) or in a manner dependent on a torque at the transmission input shaft (2).

4. The method of claim 1, wherein the system pressure is elevated in response to a control demand for disengaging a closed one of the at least one positively locking shift elements (A, F) and a change in a transmission selector lever position from a drive position D to a neutral position.

5. The method of claim 1, wherein, when a rotational speed of the drive assembly (15) is higher than a rotational speed of a transmission input shaft (2) of the transmission (1) during the increased torque output by the drive assembly (15), the positively locking shift element (A, F) to be opened is relieved of load utilizing inertias in the transmission (1) which cause the rotational speed of the transmission input shaft (2) to follow the rotational speed of the drive assembly (15) with a delay.

6. The method of claim 1, wherein, when a rotational speed of the drive assembly (15) is lower than a rotational speed of a transmission input shaft (2) of the transmission (1) during the increased torque output by the drive assembly (15), the positively locking shift element (A, F) to be opened is relieved of load by an increase of the rotational speed of the drive assembly (15).

7. The method of claim 1, further comprising further reducing the system pressure when a magnitude of a rotational speed difference between a rotational speed of a transmission input shaft (2) of the transmission (1) and a rotational speed of the drive assembly (15) is lower than a threshold value and when the rotational speed of the drive assembly (15) and the rotational speed of the transmission input shaft (2) cross.

8. The method of claim 7, wherein the intervention of the drive assembly (15) and the increased torque output by the drive assembly (15) terminates before the system pressure is further reduced.

9. The method of claim 1, wherein the method is performed in a sailing mode of the motor vehicle when, during sailing, the at least one more shift element of the plurality of shift elements is open than in the force locking gear ratio, and when, during sailing, a transmission selector lever position changes from a drive position to a neutral position.

10. A control device for operating a drivetrain of a motor vehicle, the drivetrain having a drive assembly (15), a transmission (1) and an output (16), the transmission (1) having a plurality of shift elements with at least one positively locking shift element (A, F) and at least one frictionally locking shift element (B, C, D, E), a first number of the plurality of shift elements is closed and a second number of plurality of shift elements is open in each engaged force locking gear ratio of the transmission (1), at least one more shift element of the plurality of shift elements is open in a force-locking-free state of the transmission (1) than in a force locking gear ratio of the transmission (1), the control device comprising:
- a processor; and
- a memory storing computer-executable instructions that, when executed by the processor, cause the processor to perform operations, the operations comprising
    - adjusting a hydraulic system in order to elevate a system pressure acting on the plurality of shift elements (A, B, C, D, E, F) when one of the at least one positively locking shift element (A, F) is closed in a force-locking-free state;
    - adjusting the drive assembly (15) in order to increase a torque output by the drive assembly (15) and then subsequently reduce the torque output by the drive assembly (15) while the system pressure is elevated; and
    - adjusting the hydraulic system to reduce the system pressure after reducing the torque output by the drive assembly (15).

11. A control device for operating a drivetrain of a motor vehicle, the control device configured to carry out the method of claim 1.

\* \* \* \* \*